United States Patent
Rossi

(10) Patent No.: US 9,021,442 B2
(45) Date of Patent: Apr. 28, 2015

(54) DYNAMIC SCENARIO TESTING OF WEB APPLICATION

(71) Applicant: Claude Rossi, Valbonne (FR)

(72) Inventor: Claude Rossi, Valbonne (FR)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 13/766,258

(22) Filed: Feb. 13, 2013

(65) Prior Publication Data

US 2014/0229920 A1    Aug. 14, 2014

(51) Int. Cl.
*G06F 11/36*    (2006.01)
*G06F 9/44*    (2006.01)

(52) U.S. Cl.
CPC ........ *G06F 11/3664* (2013.01); *G06F 11/3688* (2013.01); *G06F 11/362* (2013.01)

(58) Field of Classification Search
None
See application file for complete search history.

(56) References Cited

U.S. PATENT DOCUMENTS

| | | |
|---|---|---|
| 6,772,083 B2 | 8/2004 | Muller et al. |
| 7,099,893 B2 | 8/2006 | Bischof et al. |
| 7,124,401 B2 | 10/2006 | Mueller et al. |
| 7,185,235 B2 | 2/2007 | Radestock |
| 7,299,382 B2 | 11/2007 | Jorapur |
| 7,305,659 B2 | 12/2007 | Mueller et al. |
| 7,392,509 B2 | 6/2008 | Sinha et al. |
| 7,716,322 B2 | 5/2010 | Benedikt et al. |
| 7,856,619 B2 | 12/2010 | He et al. |
| 8,612,806 B2 | 12/2013 | Rossi |
| 2002/0069193 A1* | 6/2002 | Beavin et al. .............. 707/2 |
| 2004/0031019 A1* | 2/2004 | Lamanna et al. ........... 717/125 |
| 2005/0086644 A1* | 4/2005 | Chkodrov et al. .......... 717/124 |
| 2006/0064677 A1* | 3/2006 | Bickson et al. ............. 717/124 |
| 2007/0043701 A1* | 2/2007 | Klementiev et al. ......... 707/3 |
| 2007/0277154 A1* | 11/2007 | Badwe ..................... 717/124 |
| 2008/0079961 A1 | 4/2008 | Borodin et al. |
| 2010/0235810 A1* | 9/2010 | Campbell et al. ........... 717/106 |
| 2011/0067004 A1* | 3/2011 | Birsan et al. ............... 717/125 |
| 2011/0088015 A1* | 4/2011 | Shillington et al. ......... 717/125 |
| 2011/0173590 A1* | 7/2011 | Yanes ...................... 717/125 |

(Continued)

OTHER PUBLICATIONS

Ivory et al., "The state of the art in automating usability evaluation of user interfaces," 2001, ACM Computing Surveys (CSUR), vol. 33 Issue 4, Dec. 2001, pp. 470-516.*

(Continued)

*Primary Examiner* — Thuy Dao
*Assistant Examiner* — Stephen Berman
(74) *Attorney, Agent, or Firm* — Schwegman Lundberg & Woessner, P.A.

(57) ABSTRACT

A test automation system can include a web controller configured to provide access to at least one container displayed by an application and a web user interface (UI) configured to be controlled using the web controller. The system can include an application controller object configured to implement an application controller interface and expose methods for performing operations on application controls of the application and an application query object. The application query object can include at least one filter with at least one condition, the at least one condition defining an attribute or property of a UI element to check for. The application query object can be configured to return at least one UI control when the UI control includes at least one UI element that includes features that match criteria defined by the at least one filter and the at least one condition.

19 Claims, 15 Drawing Sheets

(56) References Cited

U.S. PATENT DOCUMENTS

2011/0283148 A1 11/2011 Rossi
2012/0030515 A1 2/2012 Birakoglu et al.
2012/0159445 A1* 6/2012 Bloching et al. ............... 717/124
2012/0174069 A1* 7/2012 Zavatone ...................... 717/124
2012/0317555 A1* 12/2012 Aluru et al. ................... 717/134
2012/0331351 A1* 12/2012 Davis et al. ................... 714/38.1
2013/0159890 A1 6/2013 Rossi
2013/0318402 A1 11/2013 Rapp et al.
2014/0115503 A1* 4/2014 Mishra .......................... 715/760

OTHER PUBLICATIONS

Jeffries et al., "User interface evaluation in the real world: a comparison of four techniques," 1991, User interface evaluation in the real world: a comparison of four techniques, pp. 119-124.*

Mesbah et al., "Invariant-based automatic testing of AJAX user interfaces," 2009, ICSE '09 Proceedings of the 31st International Conference on Software Engineering, pp. 210-220.*

\* cited by examiner

```
<SPAN
    style="DISPLAY: inline"
    id=A_bp_head:V_BPHEADOverview:T_button:I_save
    dynamicid="C11_W34_V35_thtmlb_button_1"
    tagtype="button"
    tao-class="tao-testmode">

<SPAN class=th-bt-up>
        <A
            id=C11_W34_V35_thtmlb_button_1
            class="th-bt th-bt-icontext"
            onclick="thBtMgr.click(this)">
            <IMG
                class=th-bt-img title=""
                alt=Save
                src="/SAP/bc/bsp/sap/THTMLP_STYLES/SAP_SKINS/NOVA/IMAGES/SAVE.GIF">
            <SPAN class=th-bt-span>Save</SPAN>
        </A>
    </SPAN>
</SPAN>
```

Annotations: UNIQUE ID → dynamicid; SUBTYPE → tagtype; MAIN HTML ELEMENT ID → id of <A>; IMAGE → <IMG>; INNER TEXT → Save

FIG. 6A

FIG. 6B

```
                                    QUERY CREATION
                                    ↙
            Set query = CrmController().CreateQuery()
            Set filter = query.SetFilter()  ←——— FILTER CREATION
  EXECUTE   Filter.AddCondition "crm.view", "=", "SalesEmployee"
  QUERY     Filter.AddCondition "crm.type", "=", "inputField"
       ↘                                            ↖
            Set collection = query.Select()          ADD CONDITION
            If collection Is Nothing Then
              MsgBox "Nothing has been found"
            Else
              MsgBox "Element Found: " & collection.Count
            End If
                                    ↖
                                    SHOW RESULTS
```

FIG. 8A

```
Dim controller, query, filter, crmControl, controlUri

Set controller = CrmController()
Set query = controller.CreateQuery()

Set filter = query.SetFilter()
Filter.AddCondition "crm.view", "=", "SalesEmployee"
Filter.AddCondition "crm.type", "=", "inputField"

Set crmControl = query.SelectSingle()
If Not crmControl Is Nothing Then
   controlUri = crmcontrol.GetControlUri()
   controller.SetElementValue(controlUri, "1234")
End If
```

FIG. 8B

```
Dim controller, query, filter, selector, controlUri

Set controller = CrmController()
Set query = controller.CreateQuery()
Set filter = query.SetFilter()

Filter.AddCondition "crm.application", "=", "btpartner"
Filter.AddCondition "crm.view", "=", "Partner"
Filter.AddCondition "crm.context", "=", "btpartner"
Filter.AddCondition "crm.type", "=", "ROW_SELECTOR"
Filter.AddCondition "crm.column:btpartner.partner_no", "=", "244"
Filter.AddCondition "crm.column~Partner Function", "=", "Sales employee"

Set selector = query.SelectSingle()
If Not crmControl Is Nothing Then
   controlUri = crmcontrol.GetControlUri()
   controller.Table_SelectRow controlUri
End If
```

*FIG. 10A*

```
Dim collection
Set collection = query.Select()

If collection Is Nothing Then
   MsgBox "Nothing has been found"
Else
   Msg Box "Element Found: " & collection.Count
   Dim childControl
   for i=0 To collection.Count-1
      Set childControl = collection.ControlAt(i)
      MsgBox "Uri: " & childControl.GetControlUri()
   Next
End If
```

*FIG. 10B*

| TRANSACTION TYPE | DESCRIPTION |
|---|---|
| 0000 | APPOINTMENT |
| 0025 | BUS. ACT. SIMPLE |
| 0020 | BUS.ACT.:WITH PRODS |
| 0010 | BUSINESS ACTIVITY |
| ZL10 | BUSINESS ACTIVITY_S |
| 1001 | MEETING |
| ZCPG | STORE VIST |
| ZCPT | STORE VISIT TPM |

SELECT TRANSACTION TYPE

```
Dim query, filter, SUBfiLTERi

Set query = query = CrmController().CreateQuery()
Query.ParentControlUri = "popupId=1; crm.area=WorkArea; tag=body"

Set filter = query.SetFilter()
Filter.AddCondition "crm.type", "=", "ROW_SELECTOR"
Filter.AddCondition "crm.context", "=", "proctype"
Filter.AddCondition"crm.column:proctype.process_type", "=", "1001", "/i"
Filter.AddCondition"crm.column:proctype.proc_type_descr_20", "=", "Meeting"

Dim selectorInPopup
Set selectorInPopup = query.SelectSingle()

CrmController().SearchResult_SelectRow selectorInPopup.GetControlUri()
```

FIG. 12

```
Set query = CrmController().CreateQuery()
Query.ParentControlUri = "tag=DIV;
crm.id=A_btpartner:V_Partner:T_cellerator:C_btpartner:I_"

Set filter = query.SetFilter()
filter.AddCondition "crm.application", "=", "btpartner"
filter.AddCondition "crm.view", "=", "Partner"
filter.AddCondition "crm.context", "=", "btpartner"
filter.AddCondition "crm.column:btpartner.partner_no", "=", "244"
filter.AddCondition "crm.column~Partner Function", "=", "Sales employee"

Set subFilter = filter.SetFilter()
Subfilter.AddCondition "crm.tagType", "=", "valueHelp"

Set subFilter = filter.AddFilter()
subfilter.AddCondition "crm.tagType", "=", "checkbox"

Dim collection
Set collection = query.Select()

If collection Is Nothing Then
   CBTA.Report CBTA.FAILED, "Demo Query", "No CRM Web Controls"
Else
   CBTA.Report CBTA.INFO, "Demo Query", "Element Found: " &
collection.Count, ""

Dim childControl
For i=0 to collection.Count-1
   Set childControl = collection.ControlAt(i)
   CBTA.Report CBTA.INFO, "Demo Query", "Uri: " *
childControl.GetControlUri(), ""
   Next
End If
```

FIG. 13

| Components\SAP CRM\Controls\SearchResult\SelectRow | Demo Query | Element(s) Found: 2 |
| Components\SAP CRM\Controls\SearchResult\SelectRow | Demo Query | Uri: tag=INPUT; Crm.id=A_btpartner:V_Partner; T_InputField:C_btpartner:l_mainpartner:R_2 |
| Components\SAP CRM\Controls\SearchResult\SelectRow | Demo Query | Uri: tag=INPUT; Crm.id=A_btpartner:V_Partner; T_InputField:C_btpartner:l_partner_no_descr:R_2 |

FIG. 14

DYNAMIC SCENARIO TESTING OF WEB APPLICATION

BACKGROUND INFORMATION

Test engineers often need in depth knowledge of the syntax and structure of the application that they are testing. Many applications adjust how they display data and objects depending on the size of the window to display the objects in. For example, data that appears in a certain row on one display can appear in a different row using a different display. Such variability in display can make application testing difficult.

There are some situations where a generated test will not run properly without being adapted. A test can be adapted when testing dynamic scenarios where the application displays data retrieved from a database. The data displayed may not always appear at the same position, because the data displayed can depend on the amount of data available from the database.

BRIEF DESCRIPTION OF THE DRAWINGS

FIG. 6A is an example of generated web UI element content through the example of a simple hyperlink in HTML code.
FIG. 6B shows an example of a "Save" button.
FIG. 7 illustrates an example of a page of an application.
FIG. 8A shows an example of code configured to search through the page illustrated in FIG. 7.
FIG. 8B shows an example of code configured to perform an operation on the page illustrated in FIG. 7.
FIG. 10A shows an example of code configured to search the page of FIG. 9.
FIG. 10B shows an example of code configured to iterate through a collection of UI elements retrieved in a query.
FIG. 12 shows an example of code configured to search through the popup window shown in FIG. 11.
FIG. 13 shows an example of code configured to search through the page shown in FIG. 7.
FIG. 14 shows an example of an execution report.

DETAILED DESCRIPTION

Figure 1:
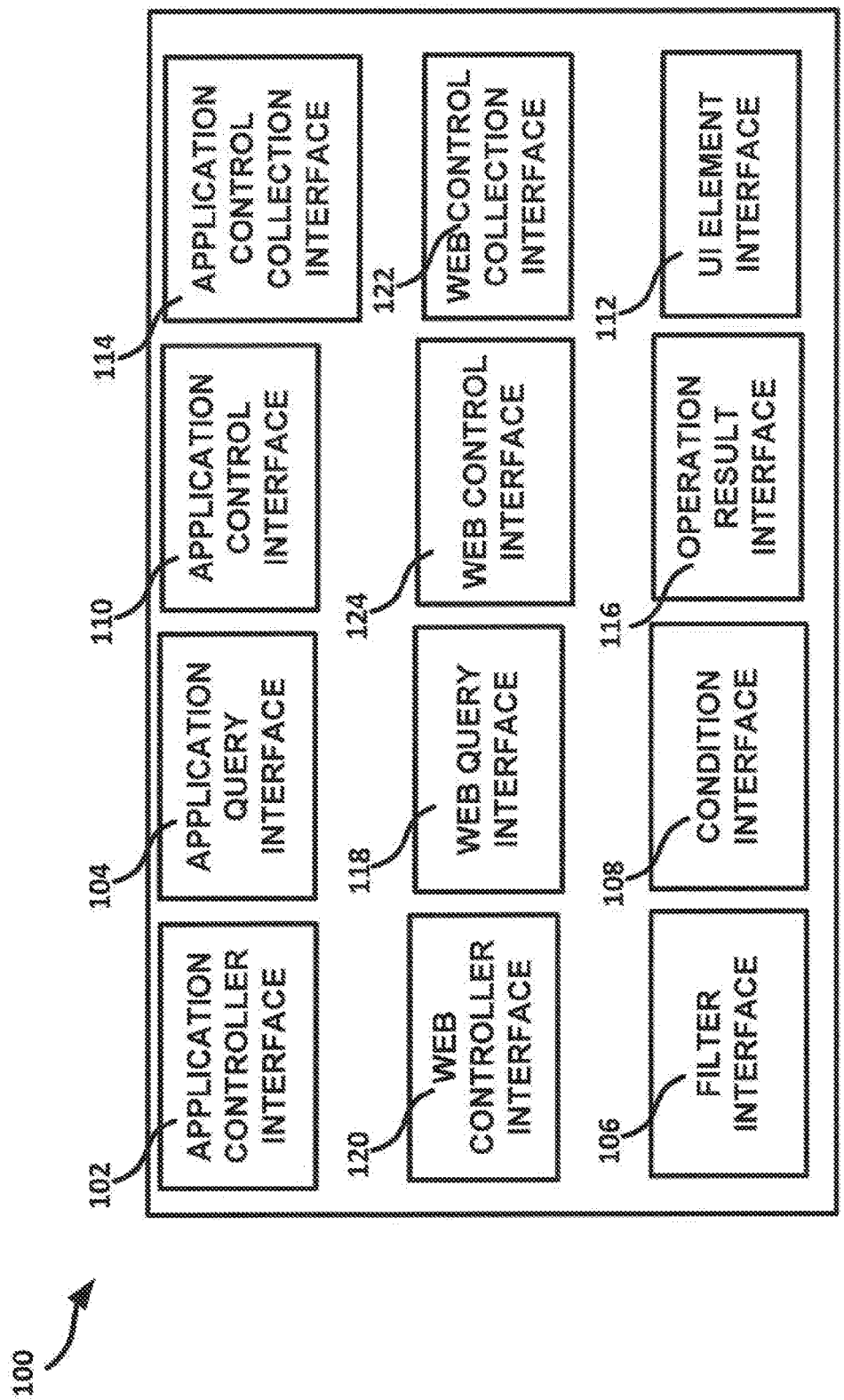
FIG. 1 is a logical block diagram of an example of a system.

Various embodiments herein include at least one of systems, methods, and software to help reduce the complexity in testing software. One or more embodiments can include a system including a web controller configured to provide access to at least one container displayed by an application and a web user interface (UI) configured to be controlled using the web controller. The system can include an application controller object configured to implement an application controller interface and expose methods for performing operations on application controls of the application and an application query object. The application query object can include at least one filter with at least one condition, the at least one condition defining an attribute or property of a UI element to check for. The application query object can be configured to return at least one UI control when the UI control includes at least one UI element that includes features that match criteria defined by the at least one filter and the at least one condition.

A test automation process can be simplified by having a script return a control of an element displayed in an application, as compared to having the process directly search for and perform actions on the element displayed. By providing an entity testing the program the ability to search controls, a test automation process can become data agnostic and the process can allow the tester to have less knowledge about the specifics of the application being tested while still allowing the tester to test the application.

A purpose of the test automation can include reducing the testing effort by using software to generate, maintain, and run automated tests. Test automation tools commonly provide features to record business scenarios that can then be stored in a repository and converted into tests. The test framework can execute the generated tests to check and validate software applications.

Creating tests by recording business scenarios can have some limitations. There are some situations where a generated test will not run properly without being adapted. Such situations can include the testing of dynamic scenarios where the application displays data coming from a database. The data displayed may not always appear at the same position depending on the amount of data available. For example, a test selecting the first line in a table is not sure to select the same information when executed again because the first line can display information that has been inserted in the database since the last test.

Test engineers, when facing such situations, often write custom scripts to solve the issue. However, automating the testing of common business scenarios can be difficult in view of complex technologies used for displaying the content. The situation can be even more difficult when testing web applications displaying information in a browser, such as HyperText Markup Language (HTML) pages that may be augmented with scripting. The HTML, coupled with its scripting capabilities, can be flexible, and most modern web applications do not restrict their User Interface (UI) to simple HTML elements. In practice, web applications are built on top of a UI framework (e.g., running server-side), which can be responsible for generating web or other HTML content. The output of such a UI framework can be very sophisticated. It can, for instance, rely on page composition techniques (e.g., using frame elements) to organize the page layout. It can also create complex UI elements that have their own semantics. There are many examples of such complex UI elements. Some examples include tables, combo-boxes, tabs, trees, lists, collapsible panels, grids, traffic lights, or progress bars, among others. Each one has its own semantic and, because of the HTML language flexibility, each one can be implemented differently by the UI framework.

A common problem when testing an application can be that the information that the test operates upon can be in different positions in a display depending on the amount of information retrieved from the database. The test engineer can adapt their test to the display and to account for the amount of information retrieved. This problem can arise when searching a web page of a web application for the content of the UI element and not the identification (ID). This can be possible, but can have drawbacks. An example of a drawback can include the test becoming complex from recursively iterating through a list of HTML UI elements displayed by a web page. Another example of a drawback can include the creation and the maintenance of the test can rely upon a deep knowledge of the UI technology. Yet another example of a drawback can include a UI element not using attribute for displaying the content. Each HTML UI element can have its own semantic and may not use the same attribute for displaying the content. A consequence can be that the test can become sensitive to the internal structure of the UI element (e.g., HTML element). Even a minor change in the way the HTML content is generated can affect the execution of the HTML content.

Each of the various embodiments described herein can address one or more of the issues, drawbacks, or problems that can be faced when testing dynamic scenarios. One or more problems encountered in test automation of an application can be solved by using a query Application Programming Interface (API) that hides the HTML complexity and allows a tester to search the displayed information, such as by using filters and conditions. The API can be implemented for testing applications that are built on top of a Web Common User InterFace (WebCUIF) framework. Examples of applications that utilize the WebCUIF framework to display HTML content are the Customer Relationship Management (CRM) applications from SAP. However, the implementation is not restricted to the WebCUIF Framework technology. The same approach can be reused or specialized to handle the content generated by a wide variety of UI frameworks.

The WebCUIF framework can be the presentation layer that generates the content (e.g., HTML content) shown by an application (e.g., a CRM Application). This framework can generate UI elements (e.g., input fields, dropdown list boxes, and checkboxes) that are a composition of several HTML elements. To help automate the tests of such generated UIs the WebCUIF framework can put some meta-information in the page (e.g., in a hidden HTML SPAN element). This meta-information may not be session-dependent and can be used by the test automation framework to generate stable tests.

When testing dynamic scenarios, the test automation of these applications can access HTML content via a native Component Object Model (COM) Interface (from Microsoft®) that the Internet Explorers browser exposes. An advantage of the Microsoft® API can be that the HTML content can be explored and manipulated at runtime. The drawback can be that this HTML content can be very complex, and the direct manipulation of the internal hierarchy of HTML UI elements can lead to unstable tests. An alternative to the native COM interfaces from Microsoft® can be to use one of the query APIs described herein. The API systems described herein can be used by a test that is generated out of a recorded scenario.

Several test frameworks are available for testing business applications. Some examples include Component Based Test Automation (CBTA), which can be a Solution Manager capability that extends the Test Composition Environment (TCE), and System Analysis and Program development (SAP) Test Automation and Optimization (TAO), which can be a product integrated with third-party products. SAP TAO provides, for example, the ability to generate tests that are compliant with Hewlett Packard (HP®) Quality Center, HP® Application Lifecycle Management (ALM) and HP® Quick Test Professional. Both CBTA and SAP TAO can benefit from one or more embodiments of the query API disclosed. The query API can be used to test applications that are based on web UI technologies such as Business Server Page (BSP), Web Dynpro Advanced Business Application Programming (ABAP), Web Dynpro Java, or Enterprise Portal, among others.

The query APIs discussed herein can have one or more advantages, including the ability to obfuscate the UI element (e.g., HTML element) complexity and provide the ability to search for UI elements and UI element controls using filters and conditions. Another potential advantage is that the query API can be specialized to simplify common needs (e.g., the API can target by default a "WorkArea" page or frame where an application displays its content). Another potential advantage can include the tester not needing to understand the internal page composition structure of the object or application being tested. Yet another advantage of the API can include the API being exposed via the COM interface of a test player COM object and can therefore be called from different languages, such as Visual Basic or other programming languages or scripting languages, such as VBScript or other scripting languages. Yet another advantage of the query API can include the ability to interact with a UI of an application, rather than working directly with the application.

One or more embodiments that include one or more of the advantages discussed are described in detail below with reference to the figures.

FIG. 1 shows a logical block diagram of an example of an API system 100. The API system 100 can include one or more interfaces configured to provide access to an application session, retrieve UI elements 220A-220B (see FIG. 2), handle collections of UI elements 220A-220B, or wrap an underlying UI element interface 112, among other functions. The API system 100 can include an application controller interface 102 that can be the entry point to provide access to an application session and to the content displayed by the application UI 214 (see FIG. 2). The API system 100 can include an application query interface 104 that can be used to retrieve one or more UI elements 220 (see FIG. 2). The application query interface 104 can provide access to a UI control (e.g., a button, text box, tables, entry in a table, link (e.g., hyperlink), drop down list, scroll button, or title box, among others) and can help hide the complexity of the underlying native UI element 220.

The API system 100 can include a filter interface 106 and a condition interface 108 defining the criteria that an attribute or property of a UI element 220 must match before being selected by a query. The API system 100 can include a web application control interface 110 that can wrap an underlying UI element interface 112 (e.g., an HTML element interface) or provide convenient methods for retrieving meta-information. The API system 100 can include an application control collection interface 114 for handling collections of UI elements 220 when several UI elements 220 match the query criteria. The application query interface 104 can provide access to a UI control (e.g., a button, text box, tables, entry in a table, link (e.g., hyperlink), drop down list, scroll button, or title box, among others) and can help hide the complexity of the underlying native application element.

The API system 100 can include a web controller interface 120 that can be an entry point providing access to the browser session and to the browser window. The API system 100 can include a web query interface 118 that can be exposed by a query object 222. The query object can be executed to retrieve UI elements 220 or UI element controls. The API system 100 can include a web control collection interface 122 for handling collections of UI elements 220 when more than one UI element 220 matches the query criteria. The web query interface 118 can provide access to the application content (e.g., HTML content) via the web control interface 124.

The API system 100 can include an operation result interface 116 that can provide a result of an operation performed on a UI element 220. The UI elements 220 (e.g., HTML elements or CRM web controls) can be identified using a Unified Resource Identifier (URI). Examples of UI controls include input fields, dropdown list boxes, check boxes, or other controls that are composed of multiple UI elements. Each UI control can include a specific identifier element (e.g., an HTML SPAN element) that includes one or more attributes or properties that can provide meta-information. A condition 226 can search for a specific meta-attribute or a meta-property. The meta-attribute or meta-property can be an attribute that is retrieved from the meta-information. The meta-information can be specific to the UI element or the UI technology.

When executing a test script, the script coding corresponding to the test can be sent to the client computer and executed using a script interpreter. A runtime library can be a set of scripts providing helper classes, functions, and procedures that help simulate user interactions with the UI.

Test components are components performing operations on UI elements 220. A runtime library can support several UI technologies and can include a set of test components. A test component implementation can delegate operations to be performed to one or more objects (e.g., COM objects). When testing a web application, this can be done by calling one or more methods of the web controller interface 120 or the application controller interface 102.

The test components targeting a UI element 220 can have an input parameter specifying the URI of the UI element 220. The URI can be a string identifying the UI element. The URI concept can be used by the query API for identifying the UI element (e.g., web controls or CRM web controls). The URI parameter can be resolved at runtime when searching for a UI element 220. The URI can be generated when recording user interactions.

Figure 2:
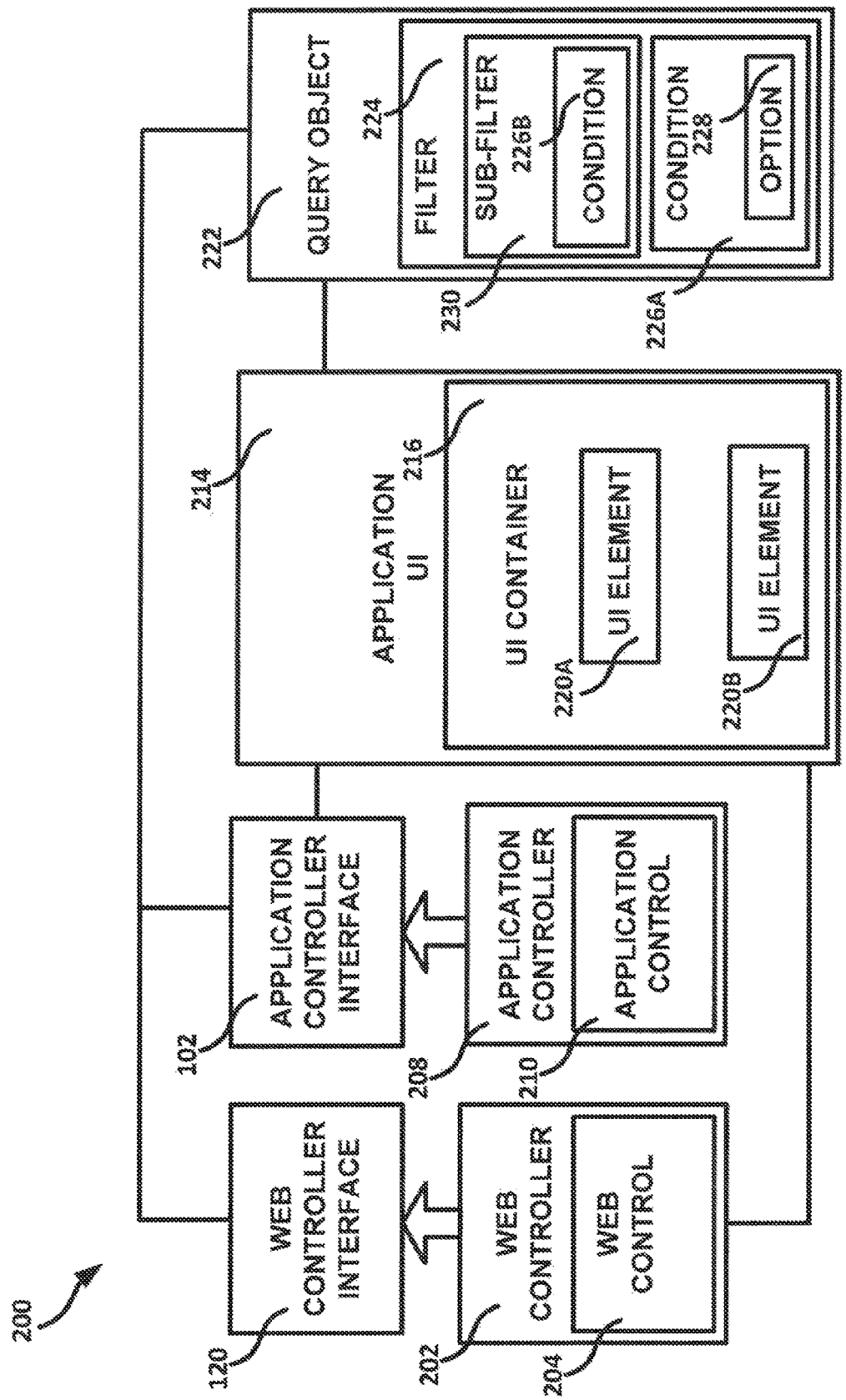
FIG. 2 is a logical block diagram of an example of a system.

FIG. 2 illustrates an example of a query API 200 that can be configured for testing dynamic scenarios. The API 200 can include a web controller class 202 that implements the web controller interface 120. The query API 200 can include a web control class 204 that can provide access to UI elements 220A-220B. The API 200 can include an application controller class 208 that can include an application control class 210 that can provide access to the UI elements 220A-220B. The application controller interface 102 or the web controller interface 120 can provide access to an application UI 214 that includes one or more application UI containers 216 that include one or more UI elements 220A-220B. The UI element 220A or 220B can be an item, object, or control of the application UI 214. Examples of UI elements 220A-220B include buttons, text boxes, tables, entries in tables, links (e.g., hyperlinks), drop down lists, scroll buttons, or title boxes, among others.

The UI elements 220A-220B can include one or more attributes or properties. Attributes or properties of a UI element 220A or 220B can include the value of the UI element 220A or 220B or the identification (ID) or URI of the UI element 220A or 220B, which can be unique within the application UI 214 or the application container 216. Other attributes or properties include the type of UI element 220A or 220B or the tagtype (e.g., sub-type) of the UI element 220A or 220B (e.g., "checkbox" for a UI element that can be a checkbox, "dropdown list box" for a combo box, or "value help" for input fields with a button or link that opens a help box, such as the F4 help popup box). Yet other attributes or properties include the name of the UI element 220A or 220B, the view of the UI element 220A or 220B, the context of the UI element 220A or 220B, the interface associated with the UI element 220A or 220B; the row at which the UI element 220A or 220B appears; the key of UI element 220A or 220B, or the column title that contains the UI element 220A or 220B.

Other attributes or properties can include: "read only" as a Boolean that indicates whether the UI element 220A or 220B can be read only or read/write, "disabled" as a Boolean which indicates whether the UI element 220A or 220B can be active or inactive, "class" as a list of one or more styles that are applied to the UI element 220A or 220B, or "href" which can be used by a UI element 220A or 220B to define where a link should navigate to, among others.

A query object 222 can be accessible through the application controller interface 102 or the web controller interface 120. The query object 222 can be configured to search the application UI 214, or a specific portion of the application UI 214, such as the application container 216. The query object 222 can search for one or more UI elements 220A-220B that include one or more attributes or properties that match criteria specified by a filter 224, condition 226A or 226B, or sub-filter 230 of the application query object 222.

The one or more conditions 226A or 226B can specify one or more properties or attributes to look for in a UI element 220A or 220B. Conditions 226 can compare operands (e.g., an attribute or property of a UI element 220A or 220B or a user specified string or value) as strings and the comparison can be case-sensitive. In one or more embodiments, the query object 222 can do non-case-sensitive comparisons. This non-case-sensitive comparison can be accomplished using one or more options 228. The one or more conditions 226A-226B can include the one or more options 228 that specify an operation that can be performed on an attribute or property specified by the condition 226A and the corresponding attribute or property of the UI element 220. The operation defined by the option 228 can be performed on the relevant attributes or properties before they are compared to determine if they are the same. Examples of operations that can be defined by the options 228 include converting to uppercase or lowercase, trimming to remove heading and trailing spaces, converting to Boolean, converting to integer; or converting to float, among others. The Boolean option can be implicit for attributes such as "read only" or "enabled" or "disabled". Converting to integer can include truncating or rounding the relevant value.

The one or more conditions 226 can support a plurality or operators to use in comparing the attribute or property specified in the condition 226 to a corresponding attribute or property of the UI element 220. Such operators include equals (e.g., "="), does not equal (e.g., "<>" or "!="), less than (e.g., "<"), greater than (e.g., ">"), less than or equal to (e.g., "<="), greater than or equal to (e.g., ">="), contains, starts with, ends with, or matches, among others.

Figure 3:
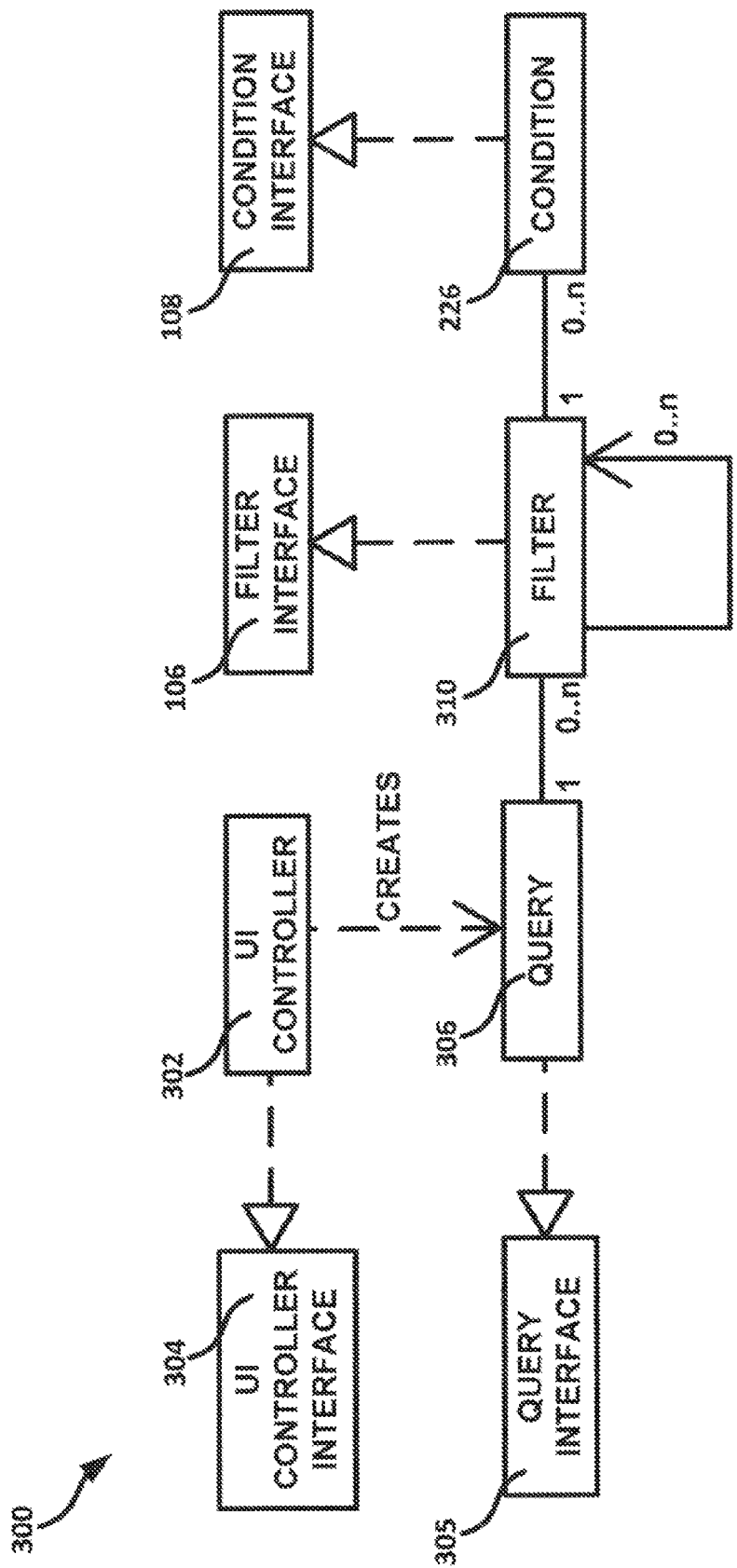
FIG. 3 is an example of a class diagram of a web query application programming interface.

FIG. 3 illustrates an example of a UI query class diagram 300 that includes functionality implemented by a query object 222 that can be implemented in a query API. The UI controller class 302 (e.g., application or web control class) can implement a UI controller interface 304 (e.g., an application controller interface 102 or a web controller interface 120) that can provide an entry point for creating a query object 222 of a specific UI query class 306.

The web controller interface 120 can provide access to a browser session and the browser window. The web controller interface 120 can be exposed by an object that can be implicitly created and maintained by a runtime library, such as during test execution. The web controller interface 120 can expose a "createquery( )" method. The createquery( ) method can be created by the UI controller class 302 and can be an entry point to the query API. The web controller interface 120 can expose other methods for performing operations on or retrieving information about UI elements 220. These exposed methods can include a URI as an input parameter and return a result through the operation result interface 116. An example of code defining a web controller interface 120 is provided:

```
public interface IWebController {
IWebQuery CreateQuery( );
IWebControl GetWebControlByUri(string uri);
IOperationResult WebControl_PressKey(string uri, string keyName);
IOperationResult WebControl_SetFocus(string uri);
IOperationResult WebControl_Click(string uri);
IOperationResult WebControl_SetProperty(string uri, string
propertyName, string aValue);
IOperationResult WebControl_GetProperty(string uri, string
propertyName);
IOperationResult WebControl_CheckProperty(string uri,
string propertyName, string booleanOperator, string expectedValue, string
options);
IOperationResult WebControl_SetAttribute(string uri, string
attributeName, string aValue);
IOperationResult WebControl_GetAttribute(string uri, string
propertyName);
IOperationResult WebControl_CheckAttribute(string uri,
string propertyName, string booleanOperator, string expectedValue, string
options);}
```

The query class 306 can implement the query interface 305 (e.g., the web query interface 118 or the application query interface 104) and provide the ability to search for the UI elements 220 (e.g., controls, such as web controls or CRM web controls).

The query interface 305 can be implemented by objects created by the createquery( ) method of the UI controller class 302. The web query interface 118 can include methods for defining filters 224. The web query interface 118 can include a "setfilter( )" method that creates a filter 224 after removing existing filters. The web query interface 118 can include an "addfilter( )" method that adds a filter 224 without removing the existing filters. The web query interface 118 can use a "parent control uri" property that makes it possible to reduce the scope of the query by specifying the URI of a UI container (e.g., an application container 216) to search for a child element of the parent element.

The web query interface 118 can include one or more methods configured to execute a query object 222. Such methods can include a method that returns the first UI element 220A that matches the criteria defined by the filters 224, sub-filters 230, and the conditions 226 or a method that returns a collection of UI elements 220A-220B that match the criteria specified by the filters 224 or conditions 226. A "max hits" parameter can be specified to indicate to stop searching when a specified number of UI elements 220A-220B has been found. An example of code defining the web query interface 118 is provided:

```
public interface IWebQuery {
string ParentControlUri { get; set; }
IFilter SetFilter( );
IFilter AddFilter( );
IWebControl SelectSingle( );
IWebControlCollection Select(int maxHits = 0);}
```

The query class 306 (e.g., a web query class or application query class) can hold a list of filter 224 objects that have a specific filter class 310 that can implement the filter interface 106. The filter class 310 holds a list of filter 224 objects, which can provide the ability to define sub-filters 230. The filter class 310 can hold a list of condition 226 objects that can implement the condition interface 108.

Figure 4:
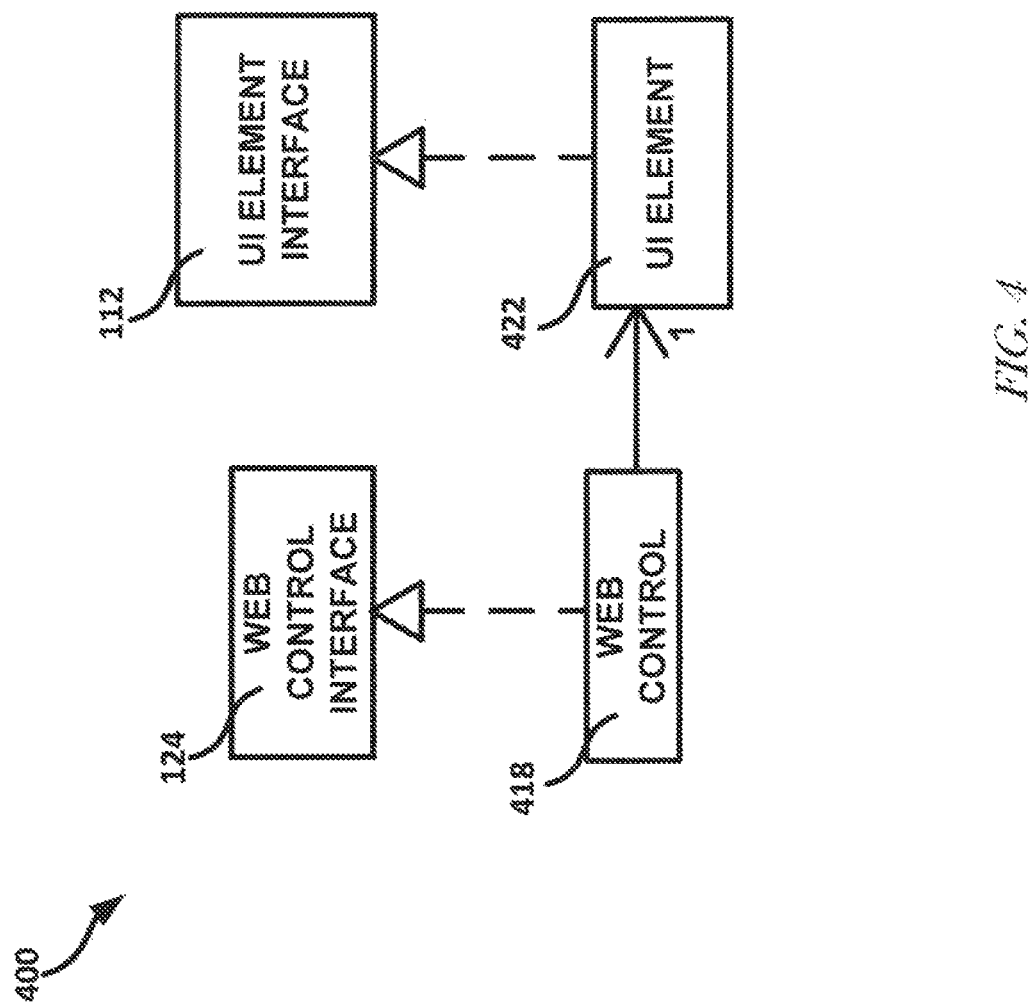
FIG. 4 is an example of a class diagram of a web control interface.

FIG. 4 illustrates an example of a web control class diagram 400 that defines functionality that can be implemented in a query API. The web query object 222 can help provide the ability to search for UI elements 220A-220B and wrap them using web control objects. A query result can help provide access to objects that can implement the web control interface 124. The web control class 418 can implement the web control interface 124 and act as a façade to the underlying web UI element class 422 (e.g., HTML element class).

There can be one web control object per UI element 220. These controls or UI elements 220 can be retrieved through executing a web query. The web control interface 124 can expose one or more methods for providing access to underlying UI element 220A or 220B attributes or properties. One such method is a "GetControlURI( )" method which can provide the URI identifying the UI element 220A or 220B. The GetControlURI( ) method can return a string that identifies a UI element 220A or 220B in the application UI 214 or the application container 216. An example of code defining a web control interface 124 is provided:

```
public interface IWebControl{
string GetControlUri( );
IHTMLElement GetHTMLElement( );
string GetAttribute(string name);
string GetProperty(string name);}
```

The GetControlURI( ) method can be used when calling methods of the web control interface 124, such as to simulate user actions. The web UI element class 422 and a corresponding UI element interface 112 (e.g., HTML element) can be exposed, such as by using the MSHTML COM API.

The application controller class 208 can implement an application controller interface 102 that can provide an entry point for creating an application query object 222 of a specific query class 306. The application controller interface 102 can provide access to an application UI 214 session. The application controller interface 102 can be exposed by an object that can be created and maintained by a runtime library, such as while testing the application UI 214. The application controller interface 102 can expose a "createquery( )" method. The createquery( ) method can be an entry point to the query API. The application controller interface 102 can include one or more methods configured to perform one or more operations on a UI element 220. One or more of these methods can include a URI as an input parameter and can return a result through an operation result interface 116. An example of code defining an application controller interface 102 is provided:

```
public interface ICrmController {
ICrmQuery CreateQuery( );
IWetController GetWebController( );
ICrmWebControl GetCrmControlByUri(string uri);
IOperationResult AttachToCrmSession(string uri);
IOperationResult LaunchAndLogin(string url, string uri);
IOperationResult LogOff(string uri);
IOperationResult InputField_SetValue(string uri, string aValue);
IOperationResult InputField_GetValue(string uri);
IOperationResult DropdownListBox_SelectItem(string uri);
IOperationResult DropdownListBox_SelectKey(string uri, string theKey);
IOperationResult DropdownListBox_SelectByValue(string uri, string
theItemValue);
IOperationResult InputField_OpenInputHelp(string uri);
IOperationResult DatePicker_OpenDatePicker(string uri);
IOperationResult DatePicker_SelectDate(string uri);
IOperationResult Button_ClickButton(string uri);
```

```
IOperationResult Button_SetButtonState(string uri, string theValue);
IOperationResult NavigationBar_ClickNavigationLink(string uri);
IOperationResult Link_ClickLink(string uri);
IOperationResult Table_SelectRow(string uri);
IOperationResult Menu_OpenSubMenu(string uri);
IOperationResult Menu_SelectMenuItem(string uri);
IOperationResult GetMessageParameters(string messageRule, string
messageId, string messageNumber);
IOperationResult CaptureScreen(string uri, string options);
IOperationResult ClosePopup(string uri, string options);
IOperationResult Checkbox_GetSelected(string uri);
IOperationResult Checkbox_SetSelected(string uri, string aValue);
IOperationResult TabStrip_SelectTab(string uri);
IOperationResult GetElementValue(string uri);
IOperationResult SetElementValue(string uri, string aValue);
IOperationResult RadioButton_Select(string uri, string theKey);}
```

The query class 306 (e.g., application query class) can implement the application query interface 104 and provide the ability to search for a UI element 220. The query class 306 can include a list of filter objects that have a specific filter class 310 that can implement the filter interface 106. The filter class 534 can hold a list of filter objects, which can enable the ability to define sub-filters 230 (indicated by the line and arrow originating and ending at the filter class 310). The filter class 310 can hold a list of condition objects 538 that can implement a condition interface 108.

The application query interface 104 can be implemented by objects created by the createquery( ) method of the application controller class 208. The application query interface 104 can be similar to the web query interface 118, with the application query interface 104 returning one or more objects that implement an application control interface 110 instead of a web control interface 124. The application query interface 104 can include one or more methods for defining filters 224 (e.g., filter objects).

The application query interface 104 can include a "setfilter ( )" method that creates a filter 224 after removing existing filters, or an "addfilter( )" method that adds a filter 224 without removing the existing filters. The application query interface 104 can use a "parent control uri" property that can help reduce the scope of the query by specifying the URI of a user interface container to search for a child element. The application query interface 104 can include methods configured to execute a query. Such methods can include a method that returns the first UI element 220A that matches the criteria defined by the filters 224, sub-filters 230, or the conditions 226 or a method that returns a collection of UI elements 220A-220B that match the criteria specified by the filters 224, sub-filters 230, or conditions 226. A "max hits" parameter can be specified to stop searching when a specified number of UI elements 220A-220B can be found. An example of source code defining the application query interface 104 is provided:

```
public interface ICrmQuery {
    string ParentControlUri { get; set; }
    IFilter SetFilter( );
    IFilter AddFilter( );
    ICrmWebControl SelectSingle( );
    ICrmWebControlCollection Select(int maxHits = 0);}
```

Figure 5:
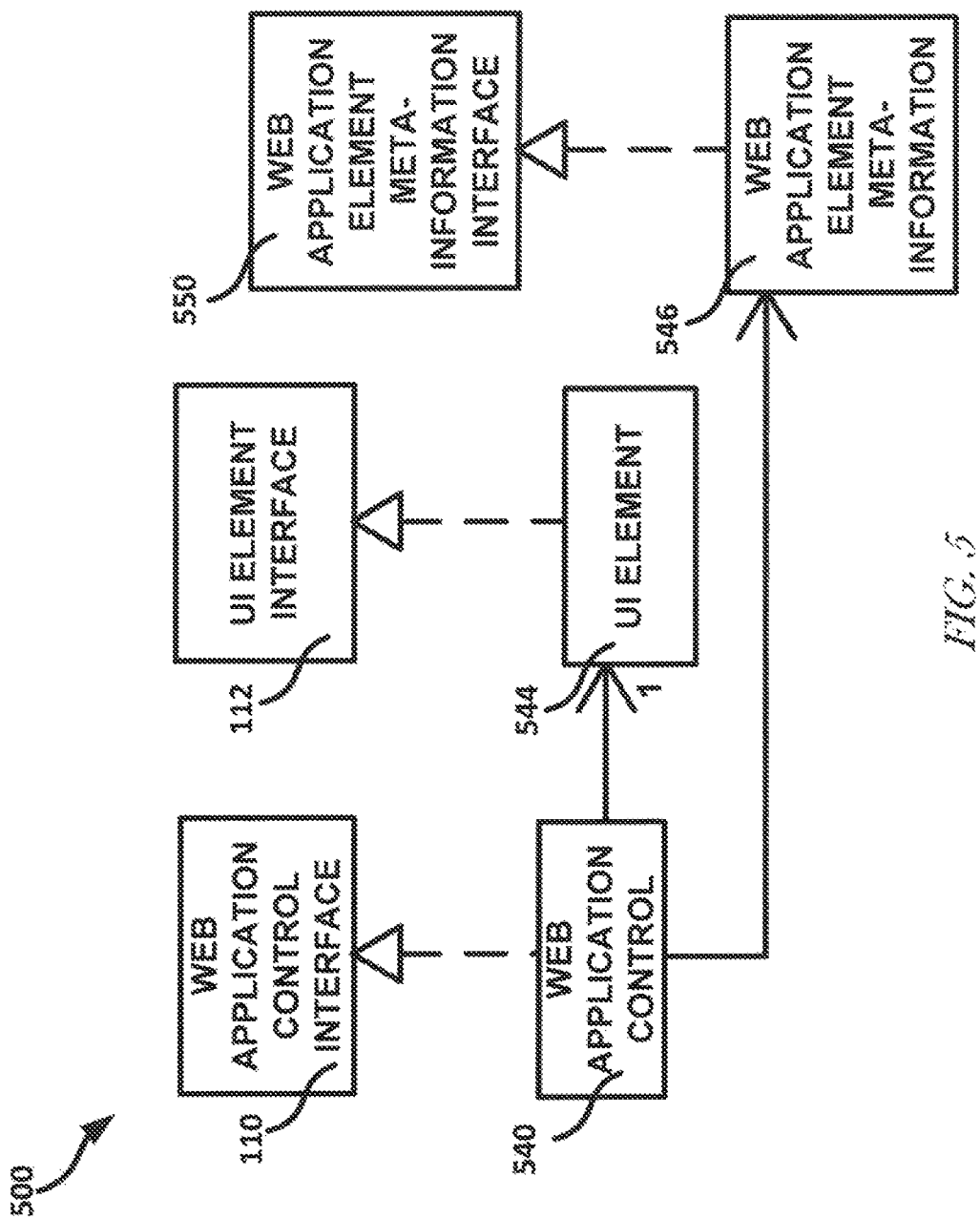
FIG. 5 is an example of a class diagram of a web application control interface.

FIG. 5 illustrates an example of a web application control class diagram 500 that defines functionality that can be implemented in an application query API. A web application control class 540 can implement an application control interface 110 and can act as a façade to an underlying UI element class 544 (e.g., an HTML element class). The application control interface 110 can be exposed by one or more application control objects. There can be one application control object per UI element 220. The UI element can be retrieved when executing a query object 222. The application control interface 110 can expose methods and provide access to the UI element 220 attributes or properties and some of the meta-information (e.g., control type) of the UI element 220. Including access to such information can help a user define filters 224 and conditions 226 that are human-readable. The application control interface 110 can help hide the complexity of the content generated by the application framework, such as the HTML content generated by a web application framework (e.g., the WebCUIF framework). The application controller interface 110 can expose a "GetControlUri( )" method that can return a string identifying a UI element 220 in the application UI 214 or in a specific container 216 of the application UI 214. This URI can be used when calling methods of the application controller interface 102, such as to simulate user actions. An example of a code defining the application control interface 110 is provided:

```
public interface ICrmWebControl {
    string GetControlUri( );
    IWebControl GetWebControl( );
    string GetCrmId( );
    string GetCrmAppilication( );
    string GetCrmViewName( );
    string GetCrmType( );
    string GetCrmContext( );
    string GetCrmInterface( );
    string GetCrmKey( );
    string GetCrmRow( );
    string GetCrmTagType( );
    string GetCrmValue( );}
```

When targeting a UI element 220 the test can access some meta-information of the UI element 220. The web application control class 540 can act as a façade to a UI element class 544 and also to a UI element meta-information class 546 that can provide the meta-information (e.g., an HTML SPAN element object can be a member of this class). The UI element class 544 and a corresponding UI element interface 112 or the UI element meta-information class 546 and a corresponding UI element meta-information interface 550, can be exposed by an HTML COM API, such as an HTML COM API provided by Microsoft®.

FIG. 6A illustrates the complexity of generated web application content through the example of a simple "Save" button, shown in FIG. 6B. FIG. 6A shows how several web UI elements 220 can be aggregated to display a single UI control. Normally, a link generated using plain HTML can be an anchor HTML element having an "href" attribute specifying its target (the page it should navigate to). With some applications, such as CRM applications in this example, the link can include anchor elements and, for improved usability and accessibility, a sophisticated HTML content can be generated. For example, the link might be decorated with an image (e.g., using an <IMG> tag). Instead of having a "href" attribute it can rely on the scripting capabilities to define its target (e.g., using an "onclick" attribute). For aesthetics, the visual aspect of the link might be altered, such as by using the class attribute to make the link appear as a button. When generated by the web CUIF framework, the link can have a parent SPAN element that can provide meta-information. The parent SPAN element can provide meta-information describing the semantic of the UI element 220, such as a CRM control. Some other tags can help improve the visual aspect of the button.

A UI element meta-information class 546 (e.g., an HTML SPAN element) can provide meta-information about the UI element 220. The meta-information can have an ID attribute that can be unique in the web application UI 214 or the application container 216. This ID can be session independent and in such a case, the test can use it to find the UI element 220. The UI element 220 can then be used by the test when simulating user actions. When generated by the web CUIF framework, this unique ID can be made of several fragments (using a specific syntax) and can provide the following information: (1) the application name ("A fragment"); (2) the view name ("V fragment"); (3) the type of the CRM Web Control ("T fragment"); (4) the context ("C fragment"); or (5) the interface (e.g., the attribute name in the context) ("I fragment"). Note that additional fragments can provide further information such as the row number (when the control can be part of or embedded in a UI element 220 that can be a table, such as a table HTML element) or a key (when the UI element 220 can be selected using its key, such as items in a dropdown list box). The meta-information object can have a "dynamicid" attribute providing the ID of the child element that represents the UI element 220. This information can be session-dependent and as such may not be able to be reused by a test automation framework.

The "Test Player" can be an object, such as a Component Object Model (COM) object deployed on a tester's machine. It can include an implementation of test components (components used to simulate user actions on the application page). The Test Player can provide access to the UI elements 220 via the query API that can be configured to hide the complexity of the application UI 214, such as a web application implemented using HTML. The runtime library can invoke the Test Player COM object to get access to a web controller interface 120 of the application UI 214.

The web controller class 202 can be an entry point to a browser window. An object in the web controller class 202 can be bound to the browser session and provide access to the hierarchy of UI containers 216 (e.g., HTML documents) being displayed by the tested application UI 214. The web controller objects in the web controller class 204 can implement the web controller interface 120 and expose methods for performing actions against UI elements 220. They can perform, for example, a mouse click on an anchor HTML element displayed by an HTML document.

The application controller 208 can be an entry point to an application controller interface 102. This object can be bound to an application session and can be a handle for the application UI 214 being tested. The application controller 208 can implement the application controller interface 102 and expose methods for performing operations on UI elements 220. The following methods can be used to set and retrieve a value from an input field: "IOperationResult InputField_SetValue (string uri, string aValue)" or "IOperationResult InputField_GetValue(string uri)". Both methods can return an operation result object implementing the operation result interface 116. The operation result interface 116 can expose information about the operation and can be used to write some human-readable feedback about the status of the operation in an execution report 1400 (shown in FIG. 14). An example of code defining an operation result interface is provided:

```
public interface IOperationResult {
string Status { get; }
string Feedback { get; }
string Value { get; }
string Comment { get; }}
```

An application query object 222 can allow a search for one or more application controls that wrap the UI elements 220 (e.g., UI elements or controls that the application UI 214 displays). A query object 222, which can include one or more filters 224, can be created using the application controller interface 102. The filter 224 can include one or more conditions 226 or sub-filters 230. The sub-filter 230 can include a condition 226B. A condition 226 can check a value of a UI element 220 attribute or property. A filter interface 106 can be implemented by a filter object. The filter interface 106 can include methods for defining sub-filters 230 or conditions 226. An example of code defining the filter interface 106 is provided:

```
public interface IFilter {
IFilter SetFilter( );
IFilter AddFilter( );
ICondition SetCondition(string attributeName, string op, string value, string option = null);
ICondition AddCondition(string attributeName, string op, string value, string option = null);}
```

The filter interface 106 can include methods for defining sub-filters 230 and conditions 226. The "SetFilter( )" method can be configured to create a filter 224 after removing existing filters (if any). The "AddFilter( )" method can be configured to add a filter 224 without removing existing filters. Similar to the AddFilter and SetFilter methods the "SetCondition" method can create a condition 226 after removing the existing conditions and the "AddCondition( )" method can be configured to add a condition 226 without removing the existing conditions. The AddCondition or SetCondition method of the filter interface 106 can implement a condition interface 108. The condition interface 108 can expose some properties or attributes or allow a user to change the condition 226 before executing a query object 222. The condition interface 108 can include properties that expose the data members of the condition 226. An example of code defining the condition interface 108 is provided:

```
public interface ICondition {
string AttributeName { get; set; }
string BooleanOperator { get; set; }
string Value { get; set; }
string Option { get; set; }}
```

The query object 222 can be used several times. The query object 222 can be bound to a specific UI container 216 and thus can have a restricted life cycle. The query object 222 can be used for the current set of one or more UI containers 216. After navigating to another UI container 216, a new query object 222 can be created (e.g., after each round-trip to an HTTP Server).

FIG. 7 shows an example of an application UI for creating a contact. In this example, three views are used for entering contact information "ContactDetails", "SalesEmployee", and "StandardAddress". A query object 222 can allow, for instance, retrieving the input fields of the SalesEmployee view.

FIG. 8A shows an example of a VBScript configured to create and execute a query object 222 to find the input fields of the SalesEmployee view of FIG. 7. The VBScript gets access to the container 216 calling a "CrmController( )" method and creates a query using a "CreateQuery( )" method. The query can be empty thus far. Next, the criteria identifying the UI elements 220 that are to be searched for can be identified. This can be done using filters 224 and conditions 226. In this example, a single filter 224 with two conditions 226 is specified. The filter 224 can be created using the SetFilter( ) method and the two conditions can be added using the AddCondition( ) method. Once the criteria (e.g., filters 224, conditions 226, or sub-filters 230) are set, the query object 222 can be executed using a "Select( )" or "SelectSingle( )" method. The Select( ) method can return a collection of application controls from the application control class 210 that can represent UI elements 220 that match the criteria. The SelectSingle( ) method can be configured to return an application control that can wrap the first UI element 220 matching the criteria. The collection returned by the Select( ) method can implement the application control collection interface 114 or the web control collection interface 122. An example of code defining the web control collection interface 122 is provided:

```
public interface IWebControlCollection{
    IWebControl ControlAt(int index);
    int Count { get; }}
```

A test script including a query object 222 can iterate through a collection of application controls and count the number of UI elements 220 that match the criteria specified.

An example of code defining the application control collection interface 114 is provided:

```
public interface ICrmWebControlCollection {
    ICrmWebControl ControlAt(int index);
    int Count { get; }}
```

The Select( ) method of the application query interface 104 can return a collection implementing the web control collection interface 122. A test script can iterate through the collection using the "count" property and the "ControlAt( )" method.

The next example shows an example of how to use a result and manipulate a retrieved UI element 220. The script shown in FIG. 8B shows code configured to invoke the SelectSingle( ) method that can expose the UI element interface 112 to retrieve a single UI element 220A. The script checks whether the "crmControl" variable is set before using it. The script then asks for the URI identifying the UI element 220A by calling the GetControlUri( ) method. This call can return a URI that identifies the UI element 220A. This URI can be passed as an input parameter to a method exposed by the application controller interface 102. The URI identifying the UI element 220A in this example is:

crm.area=WorkArea; tag=INPUT; crm.id=A_bp_cont: V_SalesEmployee; T_inputField:C_salesemployee: I_struct.salesemployee Knowing the URI, the script can now invoke a method exposed by the application controller interface 102, such as to simulate actions performed by a user. In this example, the script is configured to set the value of the input field to "1234". The script does this by calling the "SetElementValue( )" method.

Figure 9:
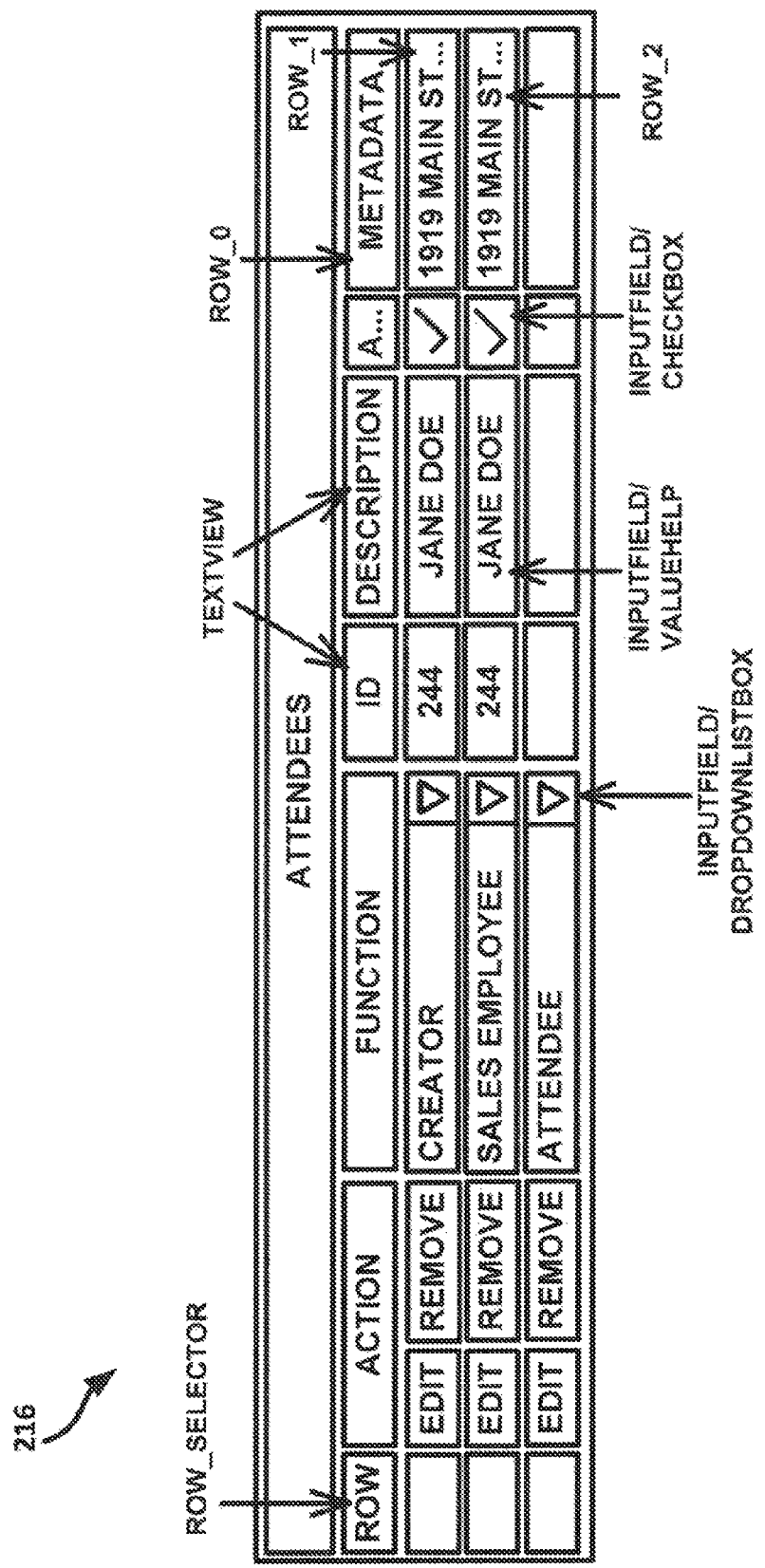
FIG. 9 shows an example of another page of an application.

The examples presented so far include static variables. The next example will explain how to select one or more UI elements 220 by filtering on the actual values of an input HTML element that a browser displays. FIG. 9 shows an HTML table UI container 216 displayed by the application UI 214 when creating an appointment. The contents of the HTML table container 216 can have a different type (and eventually a sub-type) depending on the nature of the container 216.

In this example, the task is to automate a dynamic scenario where the script selects the first row where the "function" is set to "sales employee" and "ID" is set to "244". The row selection can typically be done by selecting (e.g., doing a mouse click on) the row selector element (in the first column). As a consequence, the conditions 226 are to be checked not against the row selector UI element 220 being searched, but against the cells that are in the same row but different columns of a table UI container 216. This kind of query can be very complex when going through the internal hierarchy of UI elements 220, such as an HTML element hierarchy. To make it simple, the filters 224 and the conditions 226 of the query API can be specialized to hide the complexity and handle common use-cases like this one.

FIG. 10A shows an example of a script for a row selection. This script uses some of the different type of conditions 226 that the query object 222 can support. In this example, some conditions 226 check the attributes of one or more application controls from the application control class 210. The API can allow a user to check the regular attributes and properties or some application-specific attributes or properties. Such a configuration can make it easy to check the meta-information (e.g., to provide an ID made of several fragments). Using an Object Spy feature or the developer tool from Internet Explorer one can see that the ID of the first row selector is "A_btpartner:V_Partner:T_ROW_SELECTOR:C_btpartner:I_:R_1", where the A fragment specifies the Application, the V fragment specifies the View name, the T fragment specifies the Type, the C fragment specifies the Context Node, the I fragment specifies the interface (e.g., for input fields the technical name of the field can be placed in the I fragment), and the R fragment provides the row number.

The condition 226 can check the value of these fragments using application attributes where: the "crm.application" attribute checks the application title; the "crm.view" attribute checks the view name; the "crm.type" attribute checks for the UI element type; etc. The following script is configured to return the row selectors of the table UI container 216:

```
filter.AddCondition "crm.application", "=", "btpartner"
filter.AddCondition "crm.view", "=", "Parter"
filter.AddCondition "crm.context", "=", "btpartner"
filter.AddCondition "crm.type", "=", "ROW_SELECTOR"
```

In a non-dynamic scenario (e.g., where the row number is stable), the row could be selected using a URI, or the row number can be hardcoded, such as by using the following ID: A_btpartner:V_Partner:T_ROW_SELECTOR:C_btpartner: I_:R_2

FIG. 10A illustrates a situation where the scenario can be dynamic (e.g., the row number can unknown) and the row to be selected can sometimes appear in a different position. The script can search for it by checking the value of the columns. In this example, at least two syntaxes can be used to filter on column values. The syntax used can depend on whether the column title or the column technical name is passed, among others. The syntax can be "crm.colum: <context>.<interface>" or "crm.colum~<Column Title>". Code configured in both manners is provided:

```
filter.AddCondition "crm.column:btpartner.partner_no", "=", "244"
filter.AddCondition "crm.column:btpartner.partner_fct", "=", "sales employee"
``` or, another way of accomplishing the same thing can be:

```
filter.AddCondition "crm.column~ID", "=", "244"
filter.AddCondition "crm.column~Function", "=", "sales employee"
```

In this example the syntaxes are combined and used as follows:

```
filter.AddCondition "crm.column:btpartner.partner_no", "=", "244"
filter.AddCondition "crm.column~Function", "=", "sales employee"
```

FIG. 10B shows an example of code configured to iterate through the collection of application controls (wrapping UI elements 220) retrieved by the execution of a query object 222. The collection retrieved can implement the application control collection interface 114

An application query can by default search for UI elements 220 in a specific container 216 (e.g., WorkArea Frame) of the browser window. Consequently, the query object 222 can analyze the whole content of the body of the container 216 and compare UI element 220 attributes or properties to the filters 224, conditions 226, or sub-filters for each of the UI elements 220 that are found.

For performance reasons it might help to reduce the scope of the query and specify where to search for a UI element 220. For example, when searching for a UI element 220 of type "ROW_SELECTOR" it can make sense to narrow the search to the parent table UI container 216. Narrowing the search can be done by setting the "ParentControlUri" property of the query object 222 with the URI of the table UI container 216. The following code shows an example of code configured to narrow the search using the ParentControlUri property:

```
Dim query, filter, subfilter
Set query = CrmController( ).CreateQuery( )
query.ParentControlUri = "tag=DIV; crm.ed=A_btpartner:V_partner:
T_cellerator:C_btpartner:I_"
```

Note:
the URI syntax shown here consists of Name/Value pairs providing the information to uniquely identify a UI element 220 in an HTML document hierarchy.

Figure 11:
FIG. 11 shows an example of a popup window created by an application.

As already mentioned, queries (e.g., query objects 222) can search, such as by default, for UI elements 220 in the WorkArea page of a browser window. The default searching behavior can be changed, such as by using the ParentControlUri property. FIG. 11 shows an example of a container 216 (e.g., a popup window) of an application UI 214. FIG. 12 shows an example of code configured for searching for a UI element 220 attribute or property in the container 216. The script shown in FIG. 12 uses some conditions 226 to select the Transaction with "Transaction Type" of "1001" and a "Description" of "Meeting". The script specifies that the Work Area FRAME of the container 216 is to be searched by setting the ParentControlUri property. In this example, it would have been possible to restrict the scope even more by specifying the URI of the table like shown in this example code:

```
Query.ParentContorlUri = "popupId=1; crm.id=A_btfollowup:V_ProcType:
T_cellerator:C_proctype:I_"
```

All examples so far demonstrate using one filter 224 with several conditions 226. The conditions 226 can be evaluated one by one and the UI elements 220 can be excluded as soon as a condition 226 is not met. In other words, a logical "AND" operator can be used between conditions 226.

The next example can retrieve a collection of UI elements 220 that are either check boxes or input fields associated with an F4 Help popup. This can be done by combining several filters 224 and sub-filters 230. An example of code configured to accomplish this is shown in FIG. 13.

In this example, the main filter 224 does not check for the ROW_SELECTOR type. As a consequence, all cells within the row match its criteria. Two sub-filters 230 have been defined where the exact type of the UI element 220A to look for can be specified. The first sub-filter 230 checks for attributes or properties that are associated with an F4 Help popup using the "valueHelp" tagType. The second one checks for a checkbox UI element 220. Two sub-filters 230 have been defined where each of them has a single condition 226 checking for the "crm.tagType" attribute. The call to a "SetFilter" method (on the main filter 224 object) creates the first sub-filter 230. The second one can be added calling the "AddFilter" method. By defining several filters (e.g., a filter 224 and one or more sub-filters 230 in this example), cells matching both tagTypes can be looked for by the query object 222. A logical "OR" operator can be used between filters 224 (or sub-filters 230).

FIG. 14 shows the result of such a query in an execution report 1400. The execution report 1400 can include the result obtained after executing a query object 222. The execution report 1400 can include a list of the UI elements 220 retrieved using the query object and other details about the execution of the query object 222.

Figure 15:
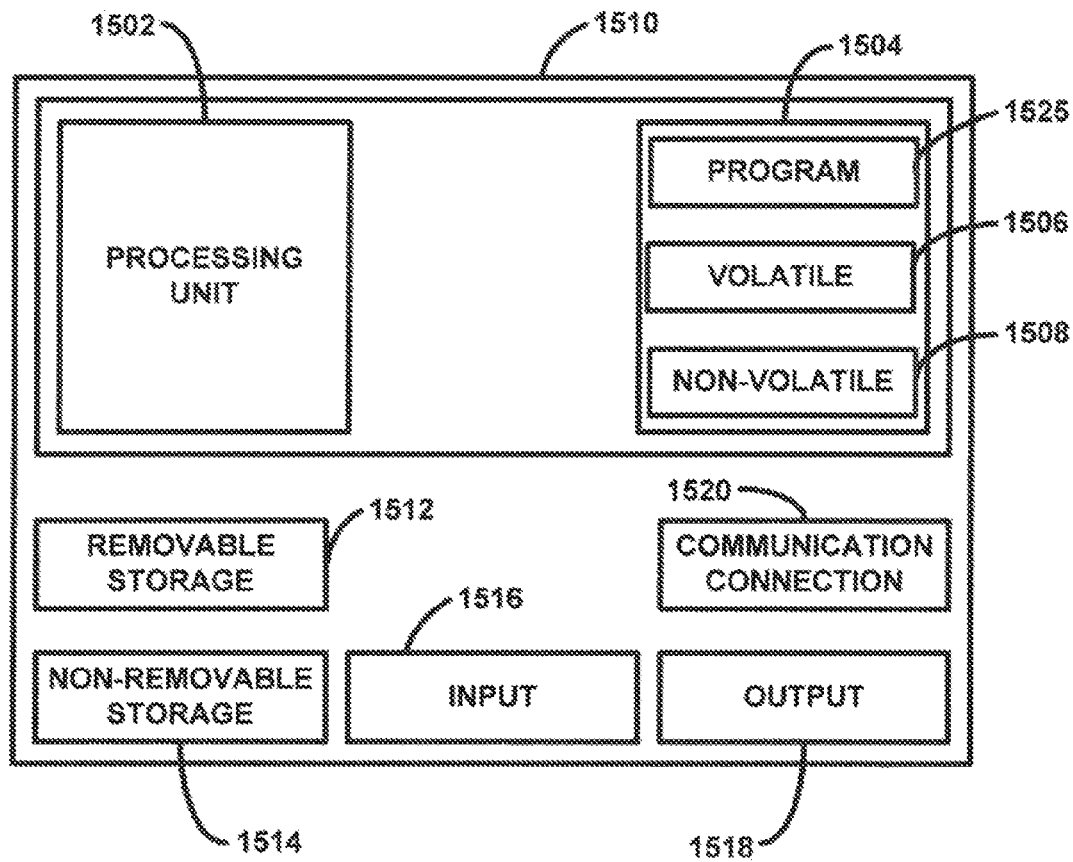
FIG. 15 shows a logical block diagram of an example of a computer system.

FIG. 15 is a block diagram of a computing device, according to an example embodiment. In one embodiment, multiple such computer systems are utilized in a distributed network to implement multiple components in a transaction-based environment. An object-oriented, service-oriented, or other architecture can be used to implement such functions and communicate between the multiple systems and components. One example computing device in the form of a computer 1510, can include a processing unit 1502, memory 1504, removable storage 1512, and non-removable storage 1514. Memory 1504 can include volatile memory 1506 and non-volatile memory 1508. Computer 1510 can include—or have access to a computing environment that includes—a variety of computer-readable media, such as volatile memory 1506 and non-volatile memory 1508, removable storage 1512 and non-removable storage 1514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1510 can include or have access to a computing environment that includes input 1516, output 1518, and a communication connection 1520. The computer can operate in a networked environment using a communication connection to connect to one or more remote computers, such as database servers. The remote computer can include a personal computer (PC), server, router, network PC, a peer device or other common network node, or the like. The communication connection can include a Local Area Network (LAN), a Wide Area Network (WAN) or other networks.

Another embodiment can be in the form of a system that can be implemented on one or more computers, such as computer 1510. Such a system includes at least one processor, at least one memory device, and at least one network interface device. The system further includes a first network and system management system stored on the at least one memory device and executable by the at least one processor to receive metric messages broadcast on a first network by network entities. The system further includes a metric message connector module stored on the at least one memory device and executable by the at least one processor.

The metric message connector module can be executable by the at least one processor, in some embodiments, to perform different data processing tasks. Such data processing tasks can include processing metric messages received by the first network and system management system to identify, based on configuration data and data of the received metric messages, metric messages to be forwarded to a second network and system management system on a second network. Further, for each received metric message identified to be forwarded to the second network and system management system, the metric message connector module can perform additional data processing tasks.

The addition data processing tasks of the metric message connector module, with regard to each metric message identified to be forwarded to the second network and system management system can include retrieving, from the at least one memory device, an XML template to populate with data of the identified metric message and mapping data that maps metric message data to fields of the XML template. The metric message connector module can then populate the XML template with data of the identified metric message according to the mapping data. Once the XML template can be populated, the metric message connector module can then transmit, via the at least one network interface device encoded within a SOAP message, the populated XML template to the second network and system management system on the second network.

Computer-readable instructions stored on a computer-readable medium are executable by the processing unit 1502 of the computer 1510. A hard drive. CD-ROM, and RAM are some examples of articles including a non-transitory computer-readable medium. For example, a computer program 1525 capable of performing one or more of the methods illustrated and described herein can be stored on a non-transitory computer-readable medium. An example of such a computer program can include a computer readable storage device including instructions stored thereon, the instructions, which when executed by a machine, cause the machine to perform operations including controlling a web user interface (UI) through a web controller object that provides access to a UI of an application through a web controller interface. The computer program can include instructions that cause the machine to perform operations on application controls of the application using an application controller object configured to implement an application controller interface and expose methods for performing the operations and execute an application query object, the application query object including at least one filter with at least one condition. The computer program can include instructions that cause the machine to compare an attribute or property specified in the at least one condition to an attribute or property of a UI element of a UI control and return the UI control when the UI control includes a UI element that includes features that match the criteria defined by the at least one filter and the at least one condition.

It will be readily understood to those skilled in the art that various other changes in the details, material, and arrangements of the parts and method stages which have been described and illustrated in order to explain the nature of the inventive subject matter can be made without departing from the principles and scope of the inventive subject matter as expressed in the subjoined claims.

What is claimed is:

1. A system comprising:
   one or more memories including instructions stored thereon;
   one or more processors coupled to the one or more memories and configured to execute the instructions to provide:
   an Application Programming Interface (API) including a web controller, a web user interface (UI), an application controller object, and an application query object; and
   a Component Object Model (COM) interface to expose the API such that the API can be called from a variety of software languages;
   the web controller configured to provide access to at least one UI container that includes one or more UI elements to be displayed by an application, wherein the application causes data to be displayed by the one or more of the UI elements to be displayed in different locations on the UI depending on an amount of data to be displayed;
   the web UI configured be controlled using the web controller;
   the application controller object configured to implement an application controller interface and expose methods for performing operations on UI containers of the application;
   the application query object accessible through the application controller interface and the web controller, the application query object including at least one filter with at least one condition, the at least one condition defining an attribute or property of a UI element to check for, the application query object configured to return at least one UI container when the UI container includes at least one UI element that includes features that match criteria defined by the at least one filter with the at least one condition; and
   wherein the query object is configured to hide a web UI complexity by exposing a single container that comprises more than one UI element.

2. The system of claim 1, wherein the web controller includes a web controller object that implements the web controller UI.

3. The system of claim 1, wherein the query object is configured to retrieve a control object that provides information relevant for testing the UI element including information identifying the returned UI element.

4. The system of claim 1, wherein the query object is configured to include at least one sub-filter that defines the type of UI element to search for.

5. The system of claim 1, wherein the at least one condition includes options that are configured to specify operations to perform on an attribute, property, or meta-property specified in the condition and the corresponding attribute or property of the UI element before comparing them, wherein the options include at least one selected from the group including convert to uppercase, remove heading and trailing spaces, convert to Boolean, convert to integer, and convert to float.

6. The system of claim 1, wherein the query object is configured to return one of (1) the first UI element that matches criteria defined by the at least one filter and the at least one condition and (2) multiple UI elements that match the criteria defined by the at least one filter and the at least one condition.

7. A method comprising:
   exposing an Application Program Interface (API) that includes a web controller, a web user interface (Un, an application controller object, and an application query object, using a Component Object Model (COM) interface such that the API can be called from a variety of software languages;

Controlling the web UI through a web controller object, the web controller object provides access to at least one UI container that includes on ore more UI elements to be displayed by an application, wherein the application causes data to be displayed by one or more of the UI elements in different location on the UI depending on an amount of the data to be displayed;

performing operations on application containers of the application using an application controller object configured to implement an application controller interface and expose methods for performing the operations on the UI containers;

executing an application query object, the application query object including at least one filter with at least one condition;

comparing an attribute or property specified in the at least one condition to an attribute or property of a UI element of a UI container;

returning the UI container when the UI container includes a UI element that includes features that match the criteria defined by the at least one filter and that at least one condition; and wherein the query object is configured to hide a web UI complexity by exposing a single container that comprises more than one UI element.

8. The method of claim 7, further comprising:
exposing methods for performing actions on the UI container using the web controller object.

9. The method of claim 8, further comprising:
retrieving information identifying a UI element unified resource locator using the query object.

10. The method of claim 9, further comprising:
searching only a specific UI container, using the query object, for the attributes or properties defined by the at least one condition.

11. The method of claim 10, wherein searching only a specific UI container includes searching only a specific UI element of a type defined by a sub-filter of the query object.

12. The method of claim 11, further comprising:
performing an operation on an attribute or property specified in the condition and on the attribute or property of the UI element before comparing the attribute or property of the UI element to the attribute or property specified in the condition, the operation selected from the group including convert to uppercase, remove heading and trailing spaces, convert to Boolean, convert to integer, and convert to float.

13. The method of claim 12, wherein returning the UI element includes returning one of (1) a first UI container that includes a UI element that matches criteria defined by the at least one filter and the at least one condition and (2) multiple UI containers that include a UI element that match the criteria defined by the at least one filter and the at least one condition.

14. A non-transitory computer readable storage device including instructions stored thereon, the instructions, which when executed by a machine, cause the machine to perform operations comprising:

exposing an Application Program Interface (API) that includes a web controller, a web user interface (UI), an application controller object, and an application query object, using a Component Object Model (COM) interface such that the API can be called from a variety of software languages;

controlling the web UI through a web controller object, the web controller object provides access to at least one UI container that includes one or more UI elements to be displayed by an application, wherein the application causes data to be displayed by one or more of the UI elements in different location on the UI depending on an amount of the data to be displayed;

performing operations on application containers of the application using an application controller object configured to implement an application controller interface and expose methods for performing the operations on the UI containers;

executing an application query object, the application query object including at least one filter with at least one condition;

comparing an attribute or property specified in the at least one condition to an attribute or property of a UI element of a UI container;

returning the UI container wherein the UI container includes a UI element that includes features that match the criteria defined by the at least one filter and that at least one condition; and wherein the query object is configured to hide a web UI complexity by exposing a single container that comprises more than one UI element.

15. The computer readable storage device of claim 14, wherein the instructions further comprise instructions, which when executed by the machine, cause the machine to perform operations comprising:
exposing methods for performing actions on the UI containers using the web controller object.

16. The computer readable storage device of claim 15, wherein the instructions further comprise instructions, which when executed by the machine, cause the machine to perform operations comprising:
retrieving information identifying a UI element unified resource locator using the query object.

17. The computer readable storage device of claim 16, wherein the instructions further comprise instructions, which when executed by the machine, cause the machine to perform operations comprising:
searching only a specific UI container, using the query object, for the attributes or properties defined by the at least one condition.

18. The computer readable storage device of claim 17, wherein the instructions for searching only a specific UI control include instructions, which when executed by the machine, cause the machine to perform operations comprising:
searching only a specific UI element of a type defined by a sub-filter of the query object.

19. The computer readable storage device of claim 18, wherein the instructions further comprise instructions, which when executed by the machine, cause the machine to perform operations comprising:
performing an operation on an attribute or property specified in the condition and on the attribute or property of the UI element before comparing the attribute or property of the UI element to the attribute or property specified in the condition, the operation selected from the group including convert to uppercase, remove heading and trailing spaces, convert to Boolean, convert to integer, and convert to float.

* * * * *